United States Patent
Ikushima et al.

(10) Patent No.: US 6,549,655 B1
(45) Date of Patent: Apr. 15, 2003

(54) IMAGE BINARIZATION METHOD AND IMAGE PROCESSING SYSTEM USING THE SAME

(75) Inventors: Yasuhisa Ikushima, Osaka (JP); Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/372,756

(22) Filed: Aug. 11, 1999

(30) Foreign Application Priority Data

Feb. 15, 1999 (JP) .......................................... 11-036443

(51) Int. Cl.$^7$ ................................................ G06K 9/00
(52) U.S. Cl. ....................................... 382/172; 382/270
(58) Field of Search ................................ 382/172, 173, 382/270; 358/1.9

(56) References Cited

U.S. PATENT DOCUMENTS

| | | | | |
|---|---|---|---|---|
| 5,617,484 A | * | 4/1997 | Wada et al. ................. 382/172 |
| 5,710,828 A | * | 1/1998 | Hashimoto ................... 382/172 |
| 5,740,333 A | * | 4/1998 | Yoh et al. .................... 395/109 |
| 5,748,801 A | * | 5/1998 | Goto ........................... 382/270 |
| 5,923,776 A | * | 7/1999 | Kamgar-Parsi ............. 382/173 |
| 6,172,770 B1 | * | 1/2001 | Inoue .......................... 358/1.9 |

* cited by examiner

*Primary Examiner*—Anh Hong Do
(74) *Attorney, Agent, or Firm*—Morgan, Lewis & Bockius LLP

(57) ABSTRACT

A binarization method of binarizing an image by extracting lightness (brightness, density) as a feature amount from the image. When a pixel is selected in an image, a sensitivity is added to and/or subtracted from the value concerning the Y value of the selected pixel to set a threshold value range. Next, when another pixel is selected, the sensitivity is added to or subtracted from the value concerning the Y value of the selected pixel and a new threshold value range is set containing the calculation result and the already setup threshold value range. The pixel with the value concerning the Y value of any pixel in the image within the threshold value range is extracted as the same brightness as the selected pixel and the extraction result is displayed.

26 Claims, 11 Drawing Sheets

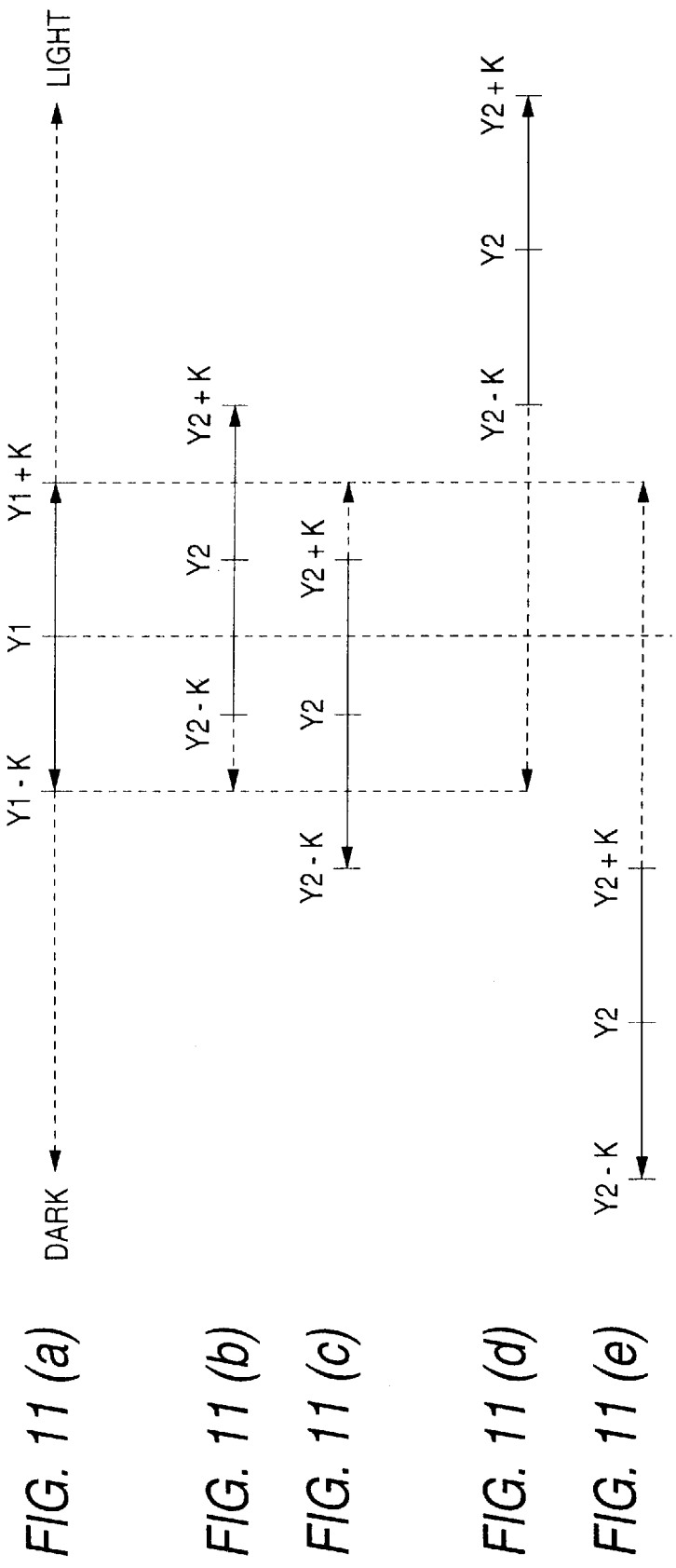

IMAGE BINARIZATION METHOD AND IMAGE PROCESSING SYSTEM USING THE SAME

BACKGROUND OF THE INVENTION

1. Field of the Invention

This invention relates to a binarization method of binarizing an image by extracting lightness (brightness, density) as a feature amount from the image, and an image processing system using the method.

2. Description of the Related Art

In extraction processing intended for extracting an object from an image, it is important to discriminate areas contained in the image from each other. In a method of discriminating the areas, it is common practice to discriminate the image as a partial image having uniform feature amounts of lightness, color, texture, and the like.

The method of recognizing the areas with the lightness as the feature amount is already used in various industrial fields; for example, it is applied to determination as to whether or not the title lettering of a product exists, determination of the front or back of a part, inspection on parts for loss, inspection for dirt and flaw, and the like.

In a system for such purposes, an image of the object such as a product is picked up using an image pickup machine such as a camera and the picked-up image is input to an image processing system as an analog signal comprising Y values representing the lightness for each pixel, then the analog Y values input are converted into digital Y values, which then are stored in a storage unit. The image processing system displays the original image on a display unit such as a CRT based on the stored information.

By the way, to execute the determination and inspection as described above, normally a binary image is used, thus hitherto it has been common practice to directly enter a numeric value for the displayed image through an input unit from the outside, thereby binarizing the displayed image with the entered numeric value as a threshold value.

However, in the method as described above, the lightness (brightness) to be extracted is entered in a numeric value, thus it is sensuously difficult to associate the entered numeric value with the lightness corresponding thereto. This results in extreme difficulty particularly if the lightness difference in the original image is small.

SUMMARY OF THE INVENTION

It is therefore an object of the invention to provide an image binarization method wherein a pixel to be extracted on a screen can be directly selected sensuously easily without the need for setting a threshold value in a numeric value, and to provide an image processing system using the method.

According to a first aspect of the invention, there is provided an image binarization method comprising the steps of setting a threshold value range for a value concerning a Y value representing brightness of a pixel selected from an image and extracting a pixel with the value concerning the Y value in the image within the threshold value range, wherein when a pixel is selected in the image, the threshold value range is set in a range of adding a predetermined value to the value concerning the Y value of the selected pixel and/or subtracting the predetermined value therefrom, and wherein when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, a new threshold value range is set, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, a new threshold value range is set.

According to a second aspect of the invention, there is provided an image binarization method comprising the steps of setting a threshold value range for a value concerning a Y value representing brightness of a pixel selected from an image and extracting a pixel with the value concerning the Y value in the image within the threshold value range, wherein when an unextracted pixel is selected, the threshold value range is set in a range of adding a predetermined value to the value concerning the Y value of the selected unextracted pixel and/or subtracting the predetermined value therefrom, and wherein when an already extracted pixel is selected, if the value concerning the Y value of each of one or more unextracted pixels of pixels in a predetermined range containing the already extracted pixel selected is greater than an upper limit value in the threshold value range, using the value concerning the Y value of the unextracted pixel with the minimum difference between the value concerning the Y value of each of one or more unextracted pixels and the upper limit value in the threshold value range as an upper limit value, a new threshold value range is set, or if the value concerning the Y value of each of one or more unextracted pixels of pixels in a predetermined range containing the already extracted pixel selected is smaller than a lower limit value in the threshold value range, using the value concerning the Y value of the unextracted pixel with the minimum difference between the value concerning the Y value of each of one or more unextracted pixels and the lower limit value in the threshold value range as a lower limit value, a new threshold value range is set.

According to a third aspect of the invention, there is provided an image processing system for setting a threshold value range for a value concerning a Y value representing brightness of a pixel selected from an image and extracting and displaying a pixel with the value concerning the Y value in the image within the threshold value range, the image processing system comprising: first threshold value setting means, when a pixel is selected in the image, for setting the threshold value range in a range of adding a predetermined value to the value concerning the Y value of the selected pixel and/or subtracting the predetermined value therefrom; and second threshold value setting means, when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, the second threshold value setting means for setting a new threshold value range, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, second threshold value setting means for setting a new threshold value range.

According to a fourth aspect of the invention, there is provided an image processing system for setting a threshold value range for a value concerning a Y value representing brightness of a pixel selected from an image and extracting and displaying a pixel with the value concerning the Y value in the image within the threshold value range, the image processing system comprising: first threshold value setting means, when an unextracted pixel is selected, for setting the threshold value range in a range of adding a predetermined value to the value concerning the Y value of the selected unextracted pixel and/or subtracting the predetermined value therefrom; and second threshold value setting means, when an already extracted pixel is selected, if the value concerning the Y value of each of one or more unextracted pixels of pixels in a predetermined range containing the already extracted pixel selected is greater than an upper limit value in the threshold value range, the second threshold value setting means using the value concerning the Y value of the unextracted pixel with the minimum difference between the value concerning the Y value of each of one or more unextracted pixels and the upper limit value in the threshold value range as an upper limit value for setting a new threshold value range, or if the value concerning the Y value of each of one or more unextracted pixels of pixels in a predetermined range containing the already extracted pixel selected is smaller than a lower limit value in the threshold value range, the second threshold value setting means using the value concerning the Y value of the unextracted pixel with the minimum difference between the value concerning the Y value of each of one or more unextracted pixels and the lower limit value in the threshold value range as a lower limit value for setting a new threshold value range.

According to a fifth aspect of the invention, there is provided an image processing system for setting a threshold value range for a value concerning a Y value representing brightness of a pixel selected from an image and extracting and displaying a pixel with the value concerning the Y value in the image within the threshold value range, the image processing system comprising: storage means for storing a history of a selected pixel; first threshold value setting means, when a pixel is selected in the image based on the storage result of the storage means, for setting the threshold value range in a range of adding a predetermined value to the value concerning the Y value of the selected pixel and/or subtracting the predetermined value therefrom; and second threshold value setting means, when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, the second threshold value setting means for setting a new threshold value range, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, second threshold value setting means for setting a new threshold value range.

According to a sixth aspect of the invention, there is provided an image processing system comprising: selection means for operating a displayed pointer superimposed on an image and selecting a target pixel from the image; threshold value setting means for setting a threshold value range for a value concerning a Y value representing brightness of the pixel; extraction means for extracting a pixel with the value concerning the Y value in the image within the threshold value range; display means for displaying the extraction result; storage means for storing a history of a selected pixel; first threshold value setting means, when a pixel is selected in the image based on the storage result of the storage means, for setting the threshold value range in a range of adding a predetermined value to the value concerning the Y value of the selected pixel and/or subtracting the predetermined value therefrom; and second threshold value setting means, when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, the second threshold value setting means for setting a new threshold value range, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, second threshold value setting means for setting a new threshold value range.

According to a seventh aspect of the invention, there is provided an image processing system for setting a threshold value range for a value concerning a Y value representing brightness of a pixel selected from an image and extracting and displaying a pixel with the value concerning the Y value in the image within the threshold value range, the image processing system comprising: storage means for storing a history of an extracted pixel; first threshold value setting means, when an unextracted pixel is selected based on the storage result of the storage means, for setting the threshold value range in a range of adding a predetermined value to the value concerning the Y value of the selected pixel and/or subtracting the predetermined value therefrom; and second threshold value setting means, when an already extracted pixel is selected, if the value concerning the Y value of each of one or more unextracted pixels of pixels in a predetermined range containing the already extracted pixel selected is greater than an upper limit value in the threshold value range, the second threshold value setting means using the value concerning the Y value of the unextracted pixel with the minimum difference between the value concerning the Y value of each of one or more unextracted pixels and the upper limit value in the threshold value range as an upper limit value for setting a new threshold value range, or if the value concerning the Y value of each of one or more unextracted pixels of pixels in a predetermined range containing the already extracted pixel selected is smaller than a lower limit value in the threshold value range, the second threshold value setting means using the value concerning the Y value of the unextracted pixel with the minimum difference between the value concerning the Y value of each of one or more unextracted pixels and the lower limit value in the threshold value range as a lower limit value for setting a new threshold value range.

According to an eighth aspect of the invention, there is provided an image processing system comprising: selection means for operating a displayed pointer superimposed on an image and selecting a target pixel from the image; threshold value setting means for setting a threshold value range for a value concerning a Y value representing brightness of the pixel; extraction means for extracting a pixel with the value concerning the Y value in the image within the threshold value range; display means for displaying the extraction result; storage means for storing a history of an extracted pixel; first threshold value setting means, when an unextracted pixel is selected based on the storage result of the storage means, for setting the threshold value range in a range of adding a predetermined value to the value concerning the Y value of the selected pixel and/or subtracting the predetermined value therefrom; and second threshold value setting means, when an already extracted pixel is selected, if the value concerning the Y value of each of one or more unextracted pixels of pixels in a predetermined range containing the already extracted pixel selected is greater than an upper limit value in the threshold value range, the second threshold value setting means using the value concerning the Y value of the unextracted pixel with the minimum difference between the value concerning the Y value of each of one or more unextracted pixels and the upper limit value in the threshold value range as an upper limit value for setting a new threshold value range, or if the value concerning the Y value of each of one or more unextracted pixels of pixels in a predetermined range containing the already extracted pixel selected is smaller than a lower limit value in the threshold value range, the second threshold value setting means using the value concerning the Y value of the unextracted pixel with the minimum difference between the value concerning the Y value of each of one or more unextracted pixels and the lower limit value in the threshold value range as a lower limit value for setting a new threshold value range.

According to the image binarization method and the image processing systems using the method according to the first, third, fifth, and sixth aspects of the invention, when a pixel to be extracted is selected in an image, with a predetermined value added to the value concerning the Y value of the pixel and/or subtracted therefrom as a threshold value range, a pixel is extracted and after this, when a pixel different from that pixel is selected, the predetermined value is added to the value concerning the Y value of the pixel or is subtracted therefrom and a new threshold value range is set in the consecutive range between the calculation result and the already setup threshold value range, and a pixel is extracted based on the new setup threshold value range. Thus, different pixels can be selected one after another for widening the brightness extraction range stepwise, and the pixel to be extracted on the screen can be directly selected sensuously easily without the need for entering a numeric value for setting the threshold value range.

A specific description will be given with reference to schematic diagrams of FIGS. 11(*a*) to 11(*e*). For example, binarization sensitivity k is adopted as the predetermined value and a single value for the Y values is preset. When a pixel is selected in an image, the Y value of the pixel is set to Y1 and the sensitivity k is added to and subtracted from the value, thereby setting the "threshold value range of Y, Y1−k to Y1+k" as indicated by the arrow in FIG. 11(*a*). The setting of the threshold value range according to the first, third, fifth, and sixth aspects of the invention is not limited to adding and subtracting the sensitivity k to and from Y1 as the center value; the sensitivity k can be only added to or subtracted from the value or one sensitivity can be added to the value and another sensitivity can be subtracted therefrom. However, not only a single value for the Y values as described above, but also an appropriate value based on the value concerning the Y value may be used as the sensitivity k in response to the situation, needless to say.

Next, brightness is extracted based on the setup threshold value range, whereby threshold value range of the Y value of the selected pixel minus the sensitivity k to the Y value of the selected pixel plus the sensitivity k can be set. Next, when a different pixel is selected in the image, the Y value of the pixel is set to Y2 and "if Y1≦Y2, the threshold value range of Y is Y1−k to Y2+k" as indicated by the arrows in FIGS. 11(*b*) and 11(*d*); "if Y1>Y2, the threshold value range of Y is Y2−k to Y1+k" as indicated by the arrows in FIGS. 11(*c*) and 11(*e*). Further, when a different pixel is selected in the image, Y2 is assigned to Y1 and Y3, the Y value of the new selected pixel, is assigned to Y2, whereby setting of the threshold value range is repeated.

According to the image binarization method and the image processing systems using the method according to the second, fourth, seventh, and eighth aspects of the invention, when a pixel having the brightness to be extracted is selected, an unextracted pixel is selected from among the pixels in a predetermined range containing the selected pixel, a pixel most similar to the value concerning the Y value of the first selected pixel to be extracted is selected from among the selected extracted pixels, and the threshold value range is set based on the value concerning the Y value of the pixel for extracting a pixel. Thus, a similar brightness area can be stepwise extracted without changing the selected pixel.

If an unextracted pixel is selected as the pixel to be extracted, a threshold value range is set as in the image binarization method and the image processing systems using the method according to the first, third, fifth, and sixth aspects of the invention. If an already extracted pixel is selected, first an unextracted pixel is selected from among the pixels in a predetermined range containing the selected pixel and for the Y values of the selected unextracted pixels, offset amount Dy indicating the distance from the threshold value range Ty of the Y values, set for the selected pixels is calculated.

For example, if "Y≦lower limit value in Ty", "Dy=lower limit vale in Ty−Y"; if "Y>upper limit value in Ty", "Dy=Y−upper limit vale in Ty". The operation is performed for all unextracted pixels and with the pixel corresponding to the minimum Dy as brightness most similar to the pixel to be extracted, the threshold value range is expanded so as to contain the Y value of the pixel, setting a new threshold value range.

BRIEF DESCRIPTION OF THE DRAWINGS

In the accompanying drawings:

FIGS. 11(a) to 11(e) are schematic diagrams to describe the principle of the invention.

DETAILED DESCRIPTION OF THE PREFERRED EMBODIMENTS

Referring now to the accompanying drawings, there are shown preferred embodiments of the invention.

First Embodiment

Figure 1:
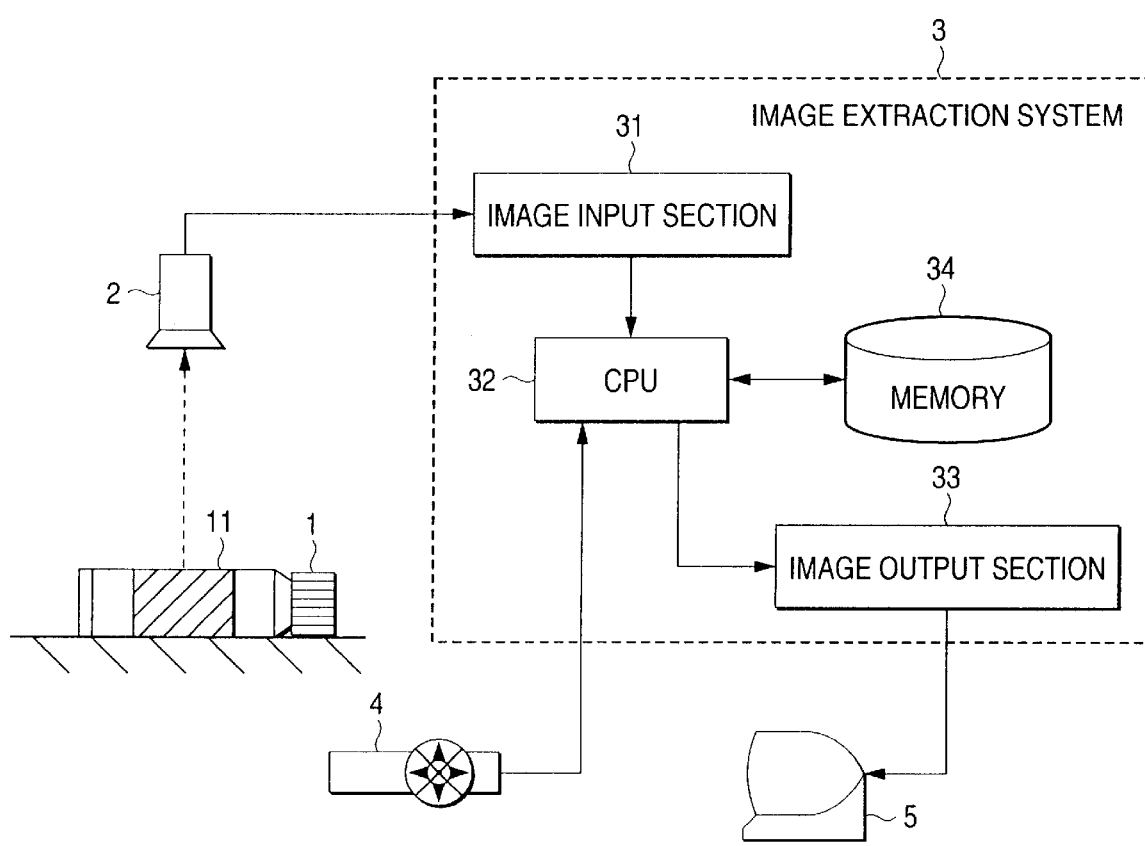
FIG. 1 is a block diagram to show the configuration of an image processing system according to a first embodiment of the invention.

FIG. 1 is a block diagram to show the configuration of an image processing system according to a first embodiment of the invention.

In FIG. 1, reference numeral 1 denotes a workpiece whose image is to picked up, such as a chemical tube on a manufacturing line, and a label 11 is put on the side of the workpiece 1. The image of the workpiece 1 is picked up by a camera 2 placed above the workpiece 1 and analog Y values of the picked-up original image is fed into an image extraction system 3 connected to the camera 2.

The image extraction system 3 comprises an image input section 31 using an A/D (analog-digital) converter, and the like, a CPU (central processing unit) 32 for performing operations, memory 34 for storing information given from the CPU 32, and an image output section 33 using a D/A (digital-analog) converter, and the like. The image input section 31 converts the analog Y values given from the camera 2 into digital Y values and feeds the digital Y values into the CPU 32, which then stores the digital Y values in the memory 34 and also feeds the Y values into the image output section 33, which then converts the digital Y values into analog Y values and outputs the analog Y values to a display unit 5 such as a CRT connected to the image extraction system 3 as the original image for displaying a display screen 51 as shown in FIG. 2 and also stores image information of the original image displayed on the display screen 51 in the memory 34.

Figure 2:
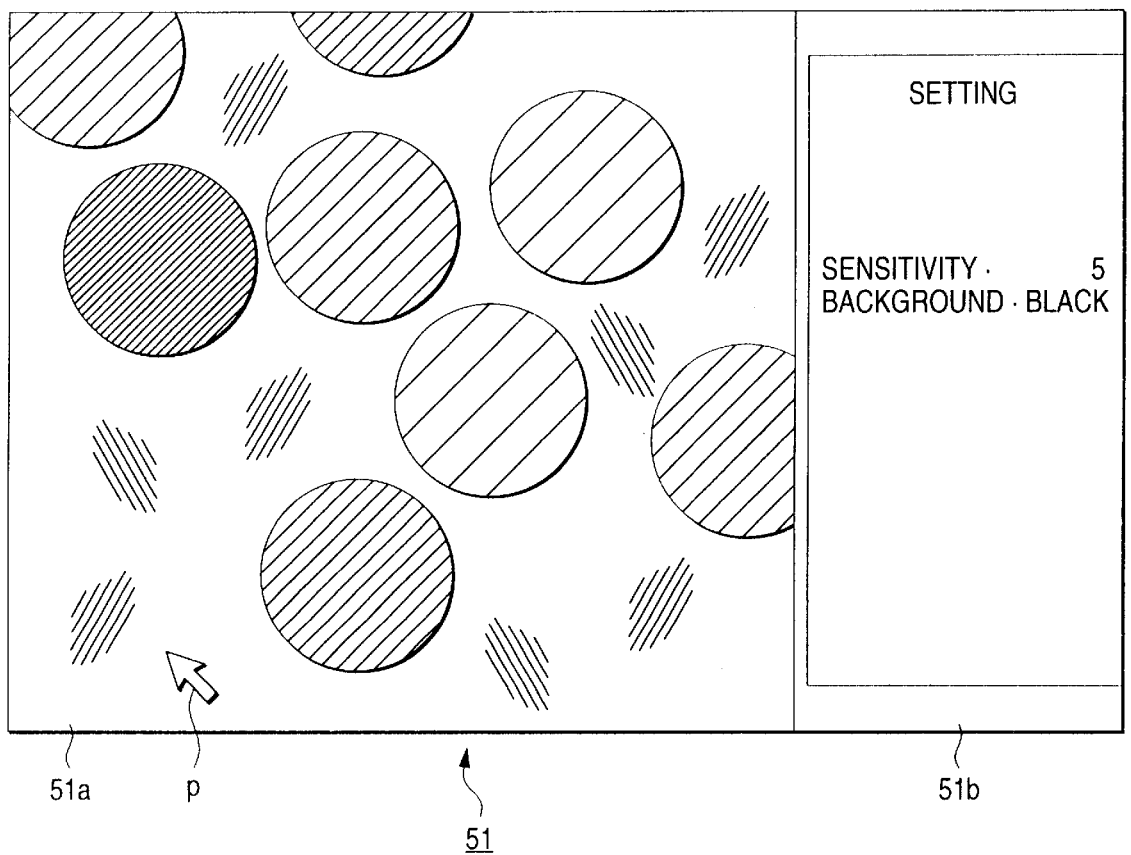
FIG. 2 is a schematic diagram to show a display screen.

FIG. 2 is a schematic diagram to show the display screen 51. The display screen 51 is divided into right and left regions. The left region is provided with an image display area 51a for displaying a picked-up original image or the extraction result. In FIG. 2, the original image of the label 11 is displayed in the image display area 51a and several circular patterns different in brightness on the substantially white background of the label 11 are displayed on the original image. A pointer p operating in response to the input operation through an input unit 4 is superimposed on the display screen 51 movably therein. The operator moves the pointer p in the display screen 51 and presses a determination button (not shown) placed on the input unit 4, for example, whereby the operator can specify the on-screen position of the pixel having brightness to be extracted from the displayed original image. In addition, the operator enters brightness extraction sensitivity k of threshold value tolerance of Y values in a numeric value through the input unit.

The right region of the display screen 51 is provided with a setting area 51b for setting the sensitivity k and display color of a screen area, which is a non-extraction area (background). As the sensitivity k, a single sensitivity k for the Y values stored in the memory 34 is displayed and a numeric value is set as an enlargement ratio described later. The background color is entered through the input unit 4 by selecting either black or white previously stored in the memory 34 and the character string of "black", or the like, indicating the selected color is displayed. The input information is stored in the memory 34.

In addition to the image information in the image display area 51a described above, image information is stored in the memory 34 in time series in response to update of the screen accompanying display of the extraction result, or the like. Further, a selection history indicating whether each pixel to be extracted from the original image displayed in the image display area 51a is selected first or second time or later in the image, and brightness information, which is the Y value of the pixel, are stored in the memory 34 in time series.

Figure 3:
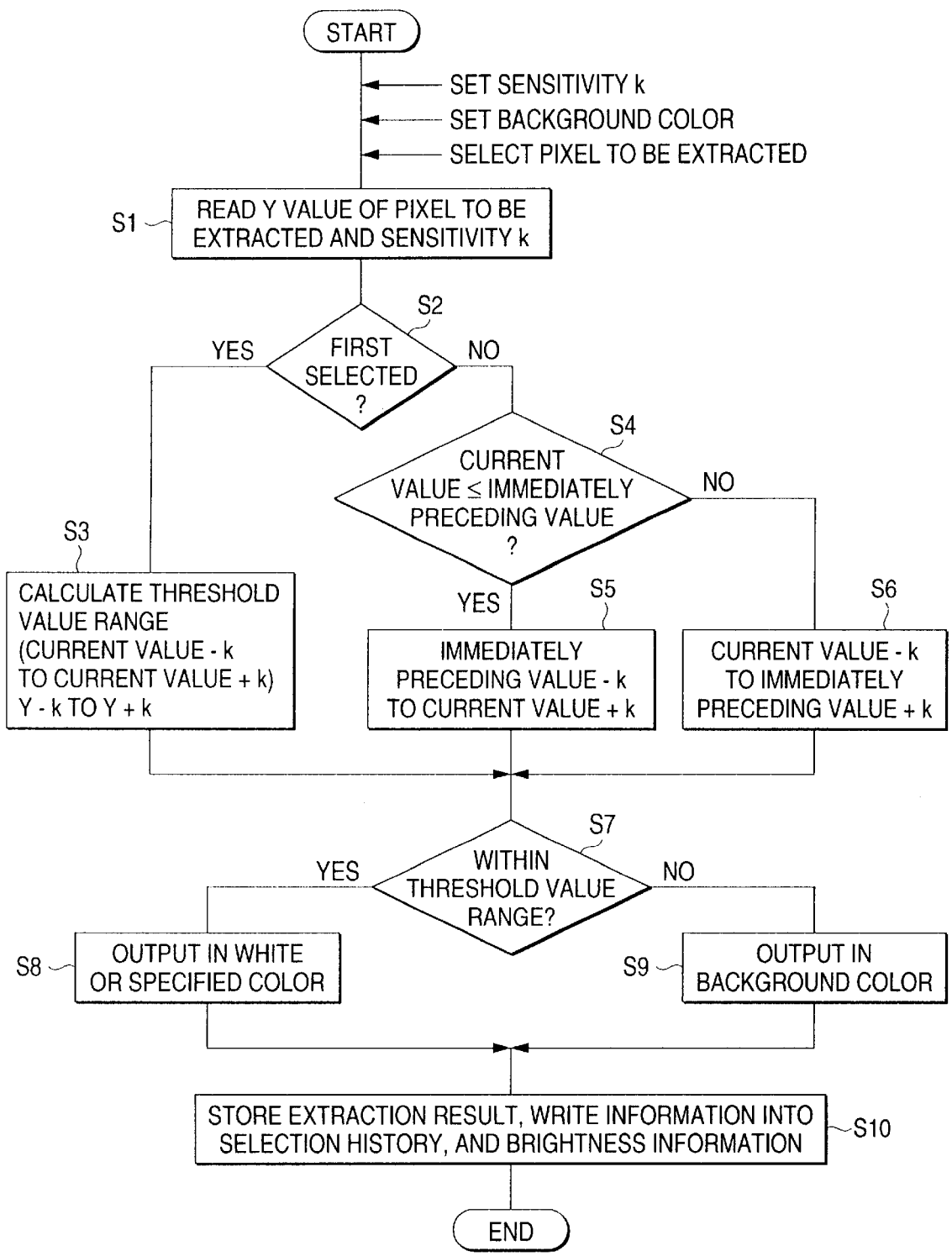
FIG. 3 is a flowchart to show the control contents of a CPU accompanying extraction processing.
Figure 4:
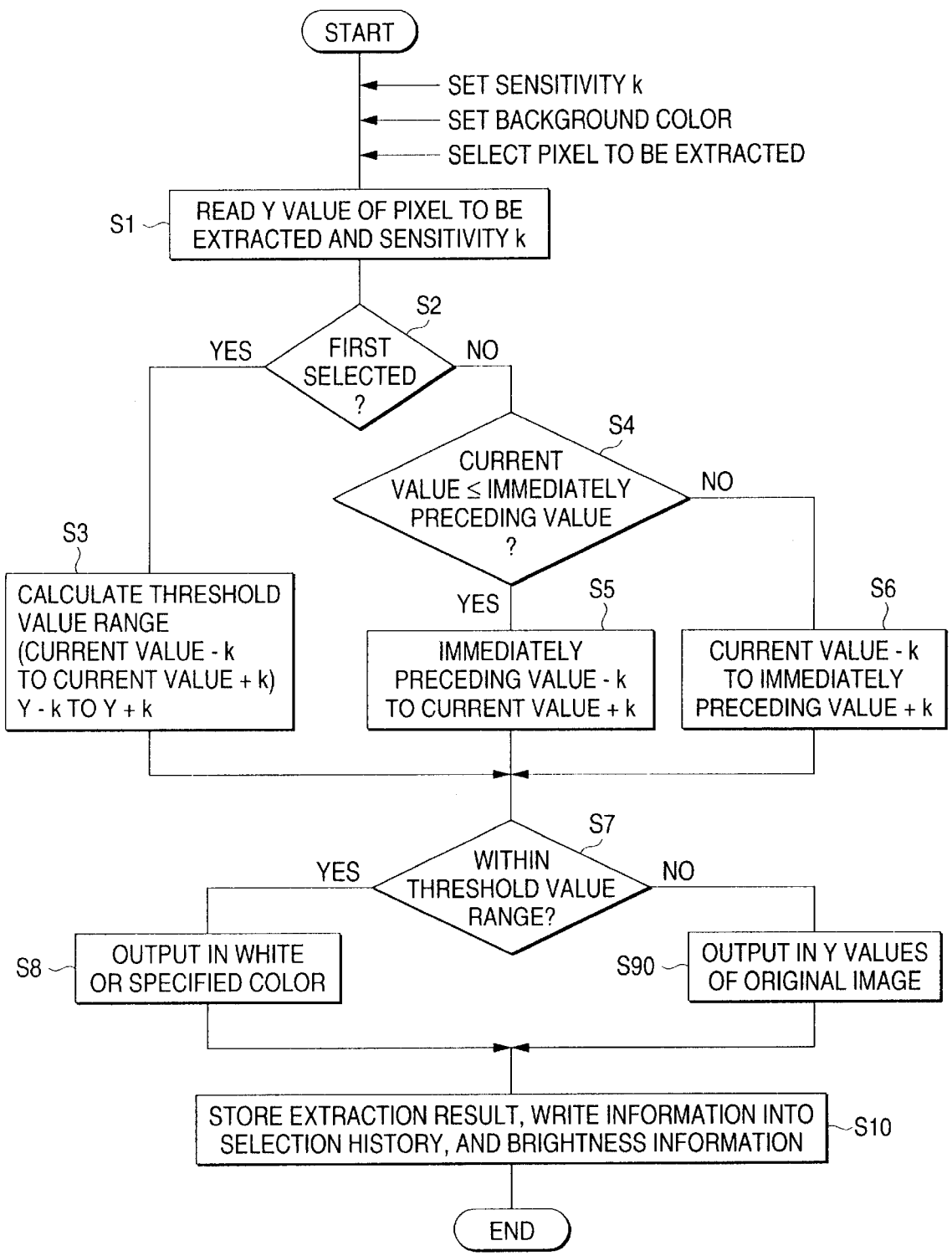
FIG. 4 is a flowchart to show the control contents of the CPU accompanying extraction processing.

FIGS. 3 and 4 are flowcharts to show the control contents of the CPU 32 accompanying extraction processing. First, a description will be given with reference to the flowchart of FIG. 3.

Using the pointer p, the on-screen position having the brightness to be extracted is input to the CPU 32, and the Y value of the pixel corresponding to the coordinates of the on-screen position and the sensitivity k are read from the memory 34 at step S1.

Whether or not the pixel having the brightness to be extracted is the first selected pixel in the original image is checked on the selection history stored in the memory 34 at step S2. If the pixel is the first selected pixel in the original image (YES at step S2), the threshold value range of Y value with Y−k to Y+k, for example, as the lower limit value to upper limit value is calculated at step S3 from the Y value and the sensitivity k read at step S1. If the pixel is not the first selected pixel in the original image (NO at step S2), the Y value of the immediately previously extracted pixel is compared with the Y value of the current selected pixel at step S4. If the immediately preceding value is equal to or smaller than the current value (YES at step S4), the threshold value range of Y value with the current value +k and the immediately preceding value −k as the upper and lower limit values is calculated at step S5. If the immediately preceding value is greater than the current value (NO at step S4), the absolute value range of the threshold value of Y value with the immediately preceding value +k and the current value −k as the upper and lower limit values is calculated at step S6.

Next, the Y values of all pixels in the original image are compared with the threshold value range at step S7. If the Y values are within the threshold value range (YES at step S7), it is judged that the pixels compared with the range are the pixels to be extracted having the same lightness as the extracted pixel, and the pixels are output to the image output section 33 in white or the specified color at step S8. If the Y values are outside the threshold value range (NO at step S7), it is judged that the pixels are non-extracted pixels, and the pixels are output to the image output section 33 in the setup background color at step S9. Then, the display contents of the image display area 51a are updated and the screen information of the extraction result, write information into the selection history indicating that the pixel is already selected in the original image, and the brightness information, which is the Y value of the pixel, are stored in the memory 34 at step S10. The display contents of the image display area 51a are stored in the memory 34 each time they are updated. Thus, if a non-target pixel is extracted in error, the pre-updated display contents can be again displayed by selecting an extraction cancel menu (not shown) in the setting area 51b.

By the way, in the flowchart of FIG. 3 described above, the extracted pixels are displayed in white or the specified color at step S8 and the non-extracted pixels are displayed in the background color at step S9. However, as shown in the flowchart of FIG. 4, the non-extracted pixels may be displayed in the Y values of the original image at step S90.

Figure 5:
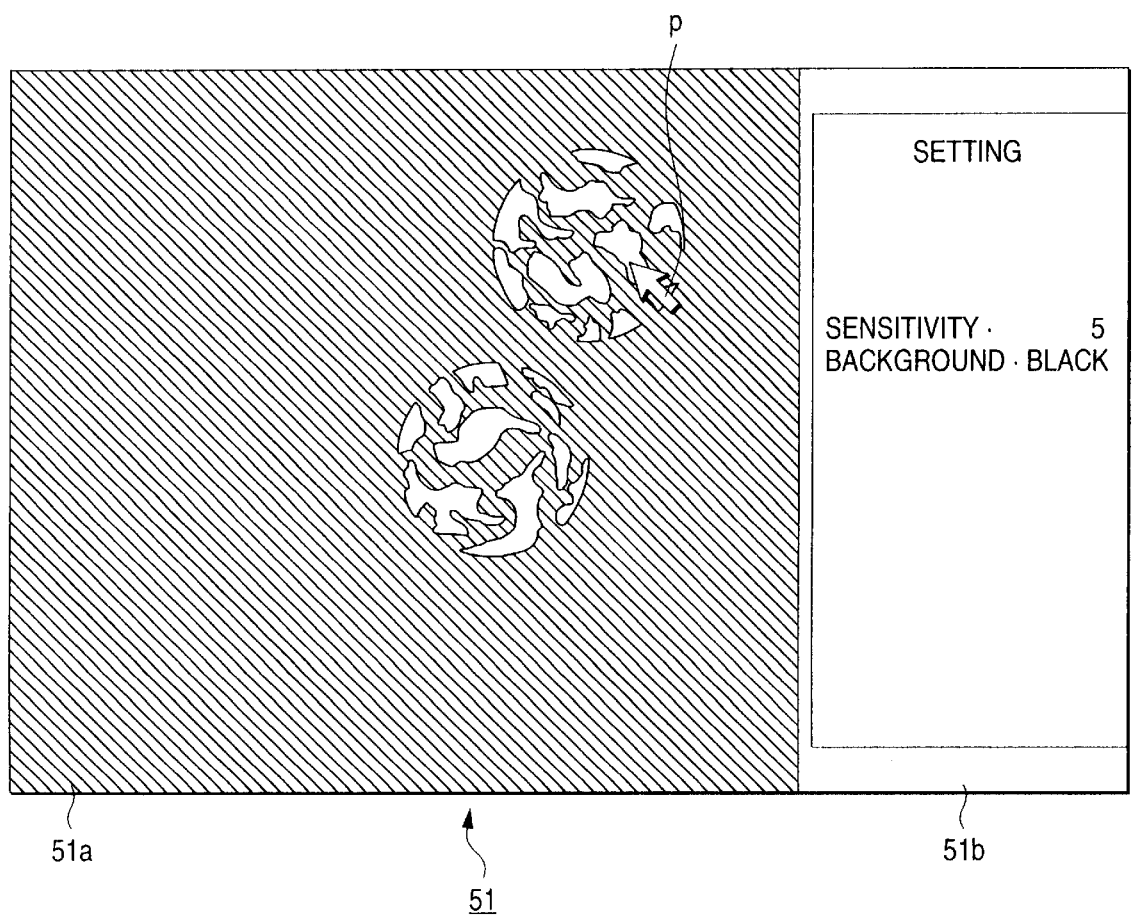
FIG. 5 is a schematic diagram to show an example of the extraction result.
Figure 6:
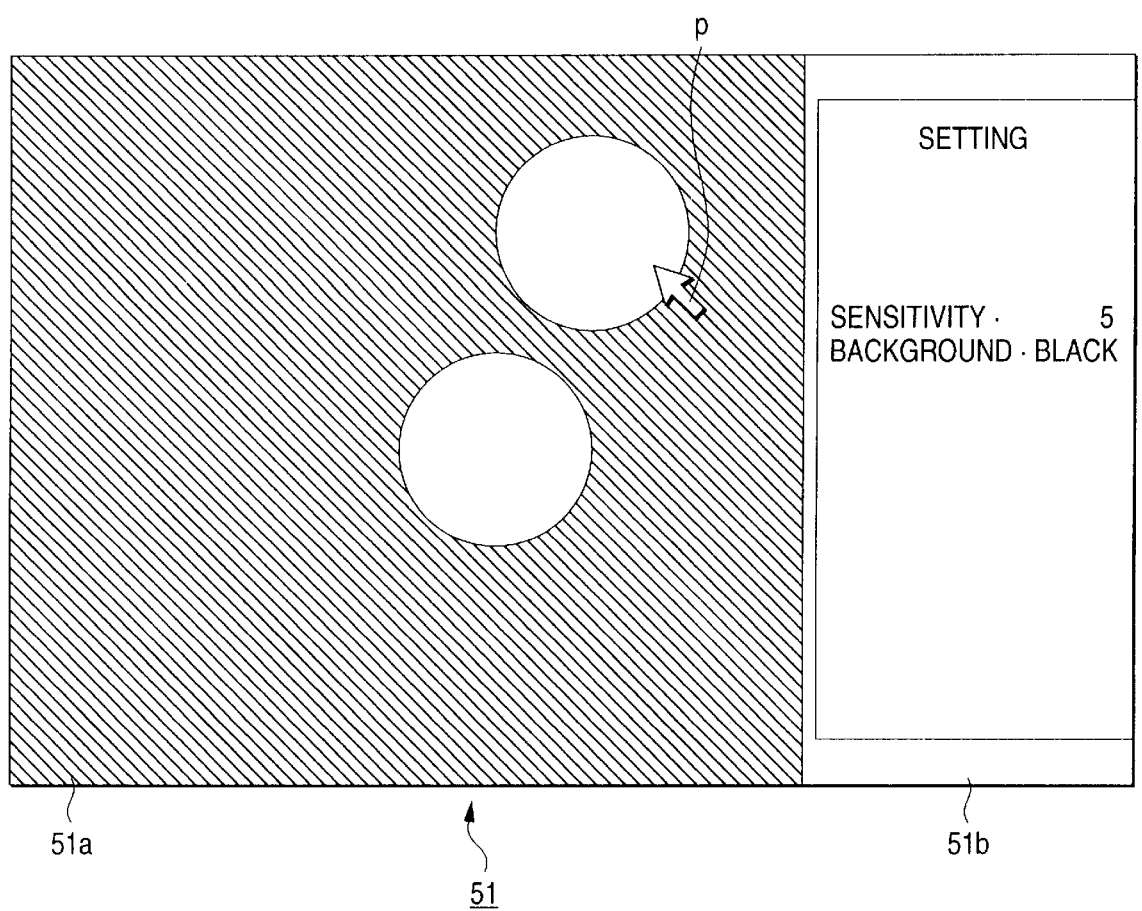
FIG. 6 is a schematic diagram to show another example of the extraction result.

FIGS. 5 and 6 are schematic diagrams to show examples of the extraction result. FIG. 5 shows a state in which the lightest area of the original image is selected with the pointer p and a part of the lightest area is extracted. In FIG. 5, a part of the lightest area to be extracted is extracted in patches. This is caused by factors of illuminating unevenness, and the like. The selected pixel described above is selected more than once and the operation of steps S1 to S9 is repeated, whereby the whole of the lightest area is extracted, as shown in FIG. 6. The number of repetitions can be reduced by setting the sensitivity k large or selecting another unextracted pixel in the lightest area.

Second Embodiment

Figure 7:
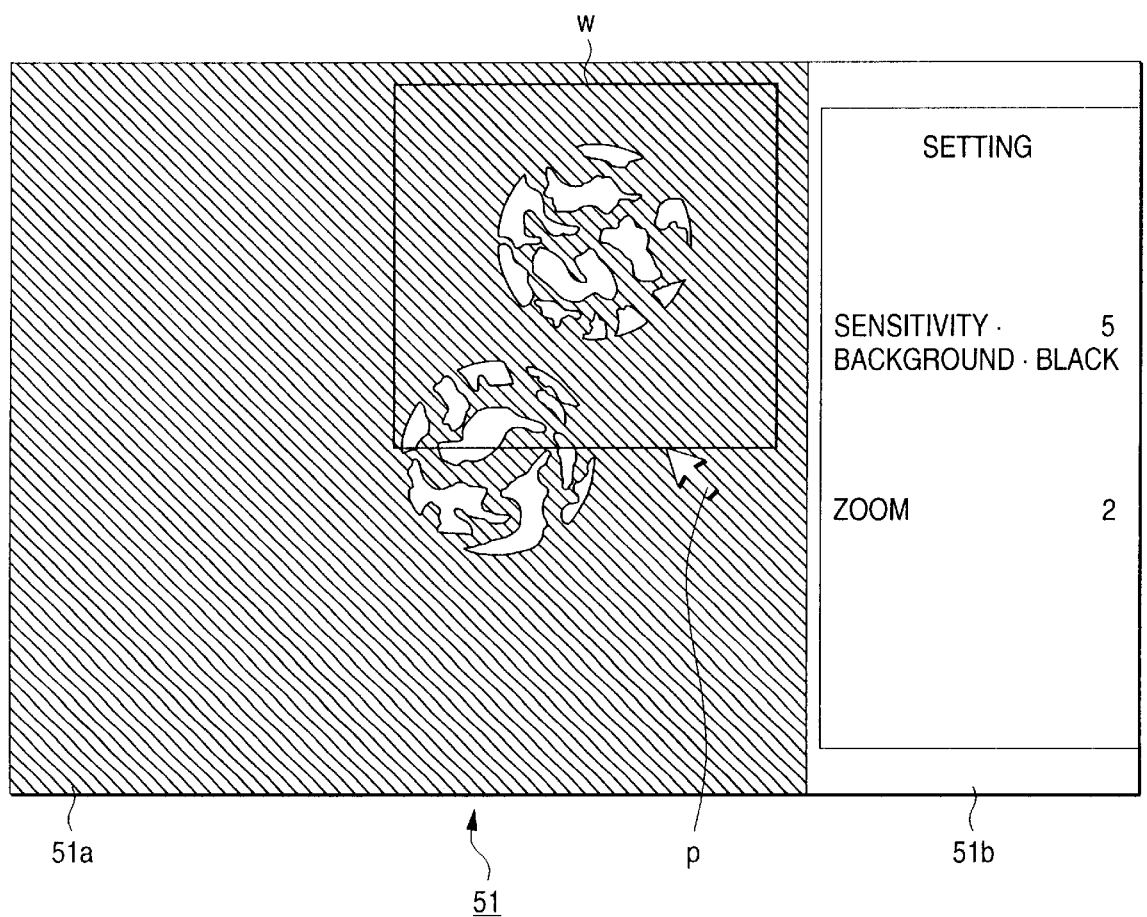
FIG. 7 is a schematic diagram to show a display screen in a second embodiment of the invention.
Figure 8:
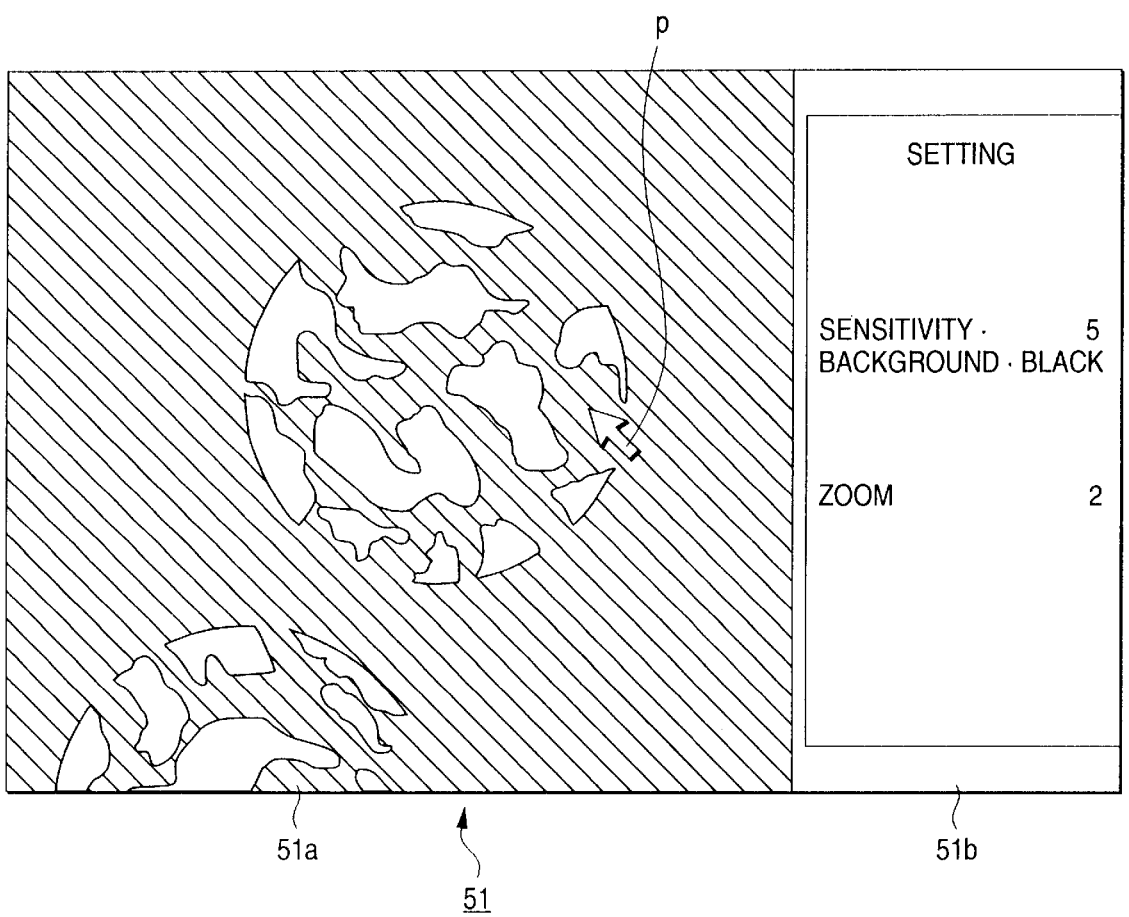
FIG. 8 is a schematic diagram to show the display screen in the second embodiment of the invention.

FIGS. 7 and 8 are schematic diagrams to show a display screen 51 in a second embodiment of the invention. FIG. 7 shows a state in which an enlargement display frame w is set and FIG. 8 shows an enlarged display state.

In an image processing system according to the second embodiment of the invention, an enlargement ratio (zoom) can be set in the setting area 51b in the first embodiment for setting the sensitivity k and the display color of a non-extraction screen area (background). The enlargement ratio is displayed in a numeric value of 1, 2 (twice), or the like, stored in memory 34. To increase or decrease the displayed numeric value, the operator places a pointer p on the displayed numeric value and directly enters a numeric value with a numeric button (not shown) placed on input unit 4 or operates an UP or DOWN button (not shown). The operator uses the pointer p to select any desired two points in an image display area 51a, whereby a part of the image surrounded by the enlargement display frame w similar to the image display area 51a having the first selected point as the upper-left corner or the lower-right corner and passing through the next selected point can be displayed on an enlarged scale and the above-described numeric value is changed in response to the enlarged display. Parts identical with or similar to those of the first embodiment are denoted by the same reference numerals and will not be discussed again.

The size of the enlargement display frame w in the second embodiment can also be changed by operating the pointer p using the input unit 4 and executing a method of drag and drop, or the like, after the enlargement display frame w is once set.

Thus, for example, even if the screen area of a new extracted pixel surrounded by already extracted pixels is small because of the size of the selection screen, the size of the pointer p, and the like, and it is difficult to precisely place the pointer p on the new extracted pixel for selecting the pixel, the peripheral area containing the new extracted pixel is displayed on an enlarged scale, whereby the size of the image relative to the pointer p is enlarged relatively and pixel selection is facilitated dramatically.

Third Embodiment

Figure 9:
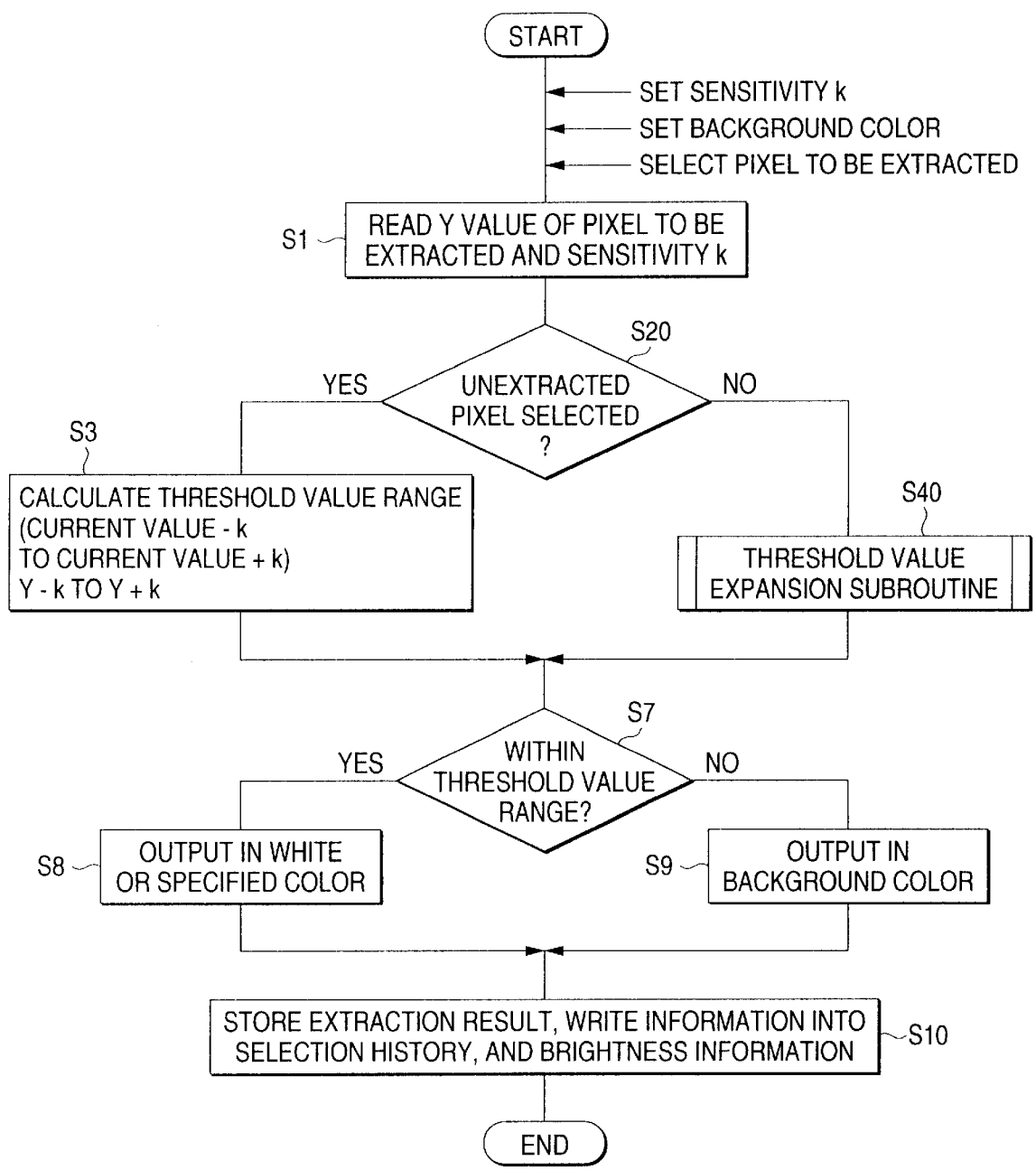
FIG. 9 is a flowchart to show the control contents of a CPU accompanying extraction processing in a third embodiment of the invention.

FIG. 9 is a flowchart to show the control contents of a CPU 32 accompanying extraction processing. In an image processing system according to a third embodiment of the invention, an extraction history indicating whether each pixel in an image is an unextracted or already extracted pixel is stored in a memory 34 in place of the selection history indicating whether or not each pixel is the first selected pixel in the image. In place of step S2 in the first embodiment in FIG. 3 at which whether or not the pixel having the brightness to be extracted is the first selected pixel in the original image is checked on the selection history stored in the memory 34, at step S20 in FIG. 9, reference is made to the extraction history for checking whether or not an unextracted pixel is selected. If the corresponding pixel is already extracted, a threshold value expansion subroutine at step S40 in FIG. 9 is executed in place of steps S4 to S6 in the first embodiment. Parts identical with or similar to those of the first embodiment are denoted by the same reference numerals and will not be discussed again.

Figure 10:
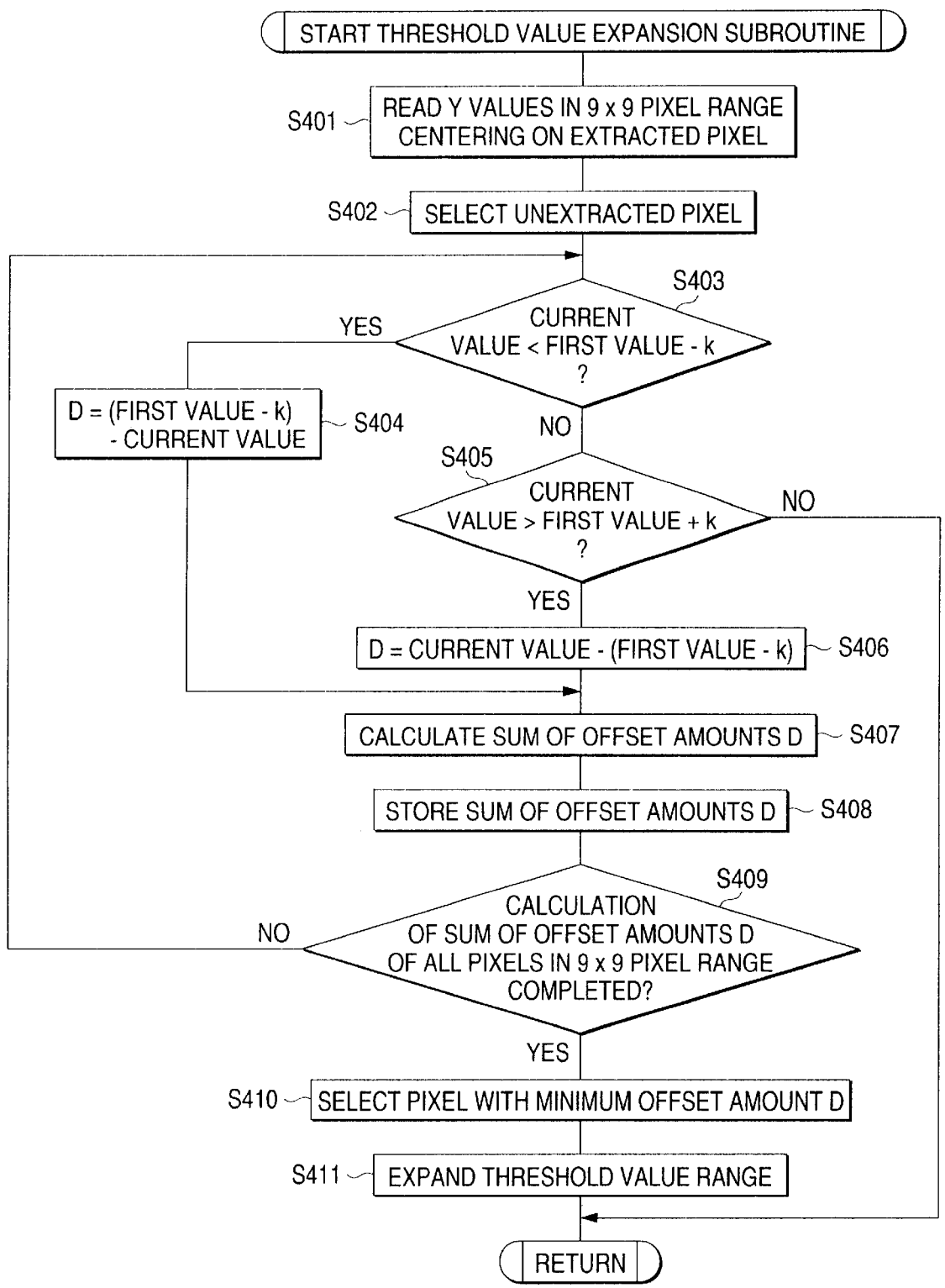
FIG. 10 is a flowchart to show the control contents of the CPU accompanying a threshold value expansion subroutine in the third embodiment of the invention.

FIG. 10 is a flowchart to show the control contents of the CPU 32 accompanying the threshold value expansion subroutine. First, Y values of all pixels in a predetermined range containing the selected pixel, for example, 9×9 (81) pixels centering on the selected pixel are read from the memory 34 at step S401 and an unextracted pixel is selected from within the 9×9 pixel range at step S402. The Y value of each unextracted pixel selected is compared with the lower limit in the threshold value range calculated at step S3 (first value −k) at step S403. The first value described here refers to the Y value of the first selected pixel in the image.

If the Y value of the pixel selected this time (current value) is smaller than the lower limit in the threshold value range calculated at step S3 (first value −k) (YES at step S403), control goes to step S404 and an offset amount D from the threshold value range is calculated based on D=(first value −k)−current value. If the current value is equal to or greater than the lower limit in the threshold value range calculated at step S5 (first value −k) (NO at step S403), control goes to step S405 and the Y value of each unextracted pixel selected at step S402 is compared with the upper limit in the threshold value range calculated at step S3 (first value +k). If the current value is greater than the upper limit in the threshold value range calculated at step S3 (YES at step S405), offset amount D is calculated based on D=current value−(first value −k) at step S406.

Following step S404 or S406, the sum of the offset amounts D calculated for the Y value of each pixel is calculated at step S407 and is stored in the memory 34 at step S408. Whether or not the sum of the offset amounts D is calculated with respect to all pixels in the 9×9 pixel range is checked at step S409. If calculation of the sum of the offset amounts D for all pixels is not completed (NO at step S409), step S403 and the later steps are repeated. If calculation of the sum of the offset amounts D with respect to all pixels is completed (YES at step S409), the pixel with the minimum sum of the offset amounts D of each pixel in the 9×9 pixel range stored in the memory 34 is selected at step S410 and the threshold value range of each value is expanded so as to contain the Y value of that pixel at step S411. At step S405, if the current value is equal to or smaller than the upper limit in the threshold value range calculated at step S5, the threshold value range is not expanded and step S7 is executed using the threshold value range calculated at step S3.

In the selection of the pixel with the minimum sum of the offset amounts D at step S410, the square of the Y value is calculated, for example, between steps S401 and S403 and is used in place of the Y value to execute step S403 and the later steps, or to calculate the sum of the offset amounts D at step S407, and the Y value is provided with a coefficient assigning the weight responsive to the distance from the pixel selected through input unit 4 to each unextracted pixel selected at step S402, whereby the selection of the pixel with the minimum sum of the offset amounts D can be made more precise.

By the way, in the above-described embodiments, the sensitivity k is added to the Y value itself and/or is subtracted therefrom for setting the threshold value range. However, the threshold value range may be set based on the value provided by performing preprocessing for image improvement such as linear or nonlinear conversion processing or histogram flattering processing for the Y value rather than the Y value itself, needless to say.

As described above in detail, according to the image binarization method and the image processing system using the method according to the invention, when a pixel to be extracted is selected in an image, with a predetermined value added to the value concerning the Y value of the pixel and/or subtracted therefrom as a threshold value range, a pixel is extracted and when after the pixel is selected, a pixel different from that pixel is selected, the predetermined value is added to the value concerning the Y value of the pixel or is subtracted therefrom and a new threshold value range is set in the consecutive range between the calculation result and the already setup threshold value range, and a pixel is extracted based on the threshold value range, whereby different pixels can be selected one after another for widening the brightness extraction range stepwise, and the pixel to be extracted on the screen can be directly selected sensuously easily without the need for setting the threshold value in a numeric value.

Any desired area of the image displayed on the screen is displayed on an enlarged scale, whereby pixel selection is more facilitated by displaying the area on the screen where the pixel having brightness to be extracted is positioned on an enlarged scale.

Further, as a pixel having the brightness to be extracted is selected, an unextracted pixel is selected from among the pixels in a predetermined range containing the selected pixel, a pixel most similar to the value concerning the Y value of the first selected pixel to be extracted is selected from among the selected extracted pixels, and the threshold value range is set based on the value concerning the Y value of the pixel for extracting a pixel, whereby a similar brightness area can be stepwise extracted without changing the selected pixel. Since an unextracted pixel is selected from among the pixels in a predetermined range containing the selected pixel, precise extraction can be executed by selecting a pixel in the proximity of the pixel to be extracted without producing enlarged display. Thus, the invention provides the excellent advantages.

What is claimed is:

1. An image binarization method comprising the steps of setting a threshold value range for a value concerning a Y value representing brightness of a pixel selected from an image and extracting a pixel with the value concerning the Y value in the image within the threshold value range, wherein when a pixel is selected in the image, the threshold value range is set in a range of adding a predetermined value to the value concerning the Y value of the selected pixel and/or subtracting the predetermined value therefrom, and wherein when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, a new threshold value range is set, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, a new threshold value range is set.

2. The image binarization method as claimed in claim 1, wherein a part of an extracted image is displayed on an enlarged scale.

3. An image binarization method comprising the steps of setting a threshold value range for a value concerning a Y value representing brightness of a pixel selected from an image and extracting a pixel with the value concerning the Y value in the image within the threshold value range, wherein when an unextracted pixel is selected, the threshold value range is set in a range of adding a predetermined value to the value concerning the Y value of the selected unextracted pixel and/or subtracting the predetermined value therefrom, and wherein when an already extracted pixel is selected, if the value concerning the Y value of each of one or more unextracted pixels of pixels in a predetermined range containing the already extracted pixel selected is greater than an upper limit value in the threshold value range, using the value concerning the Y value of the unextracted pixel with the minimum difference between the value concerning the Y value of each of one or more unextracted pixels and the upper limit value in the threshold value range as an upper limit value, a new threshold value range is set, or if the value concerning the Y value of each of one or more unextracted pixels of pixels in a predetermined range containing the already extracted pixel selected is smaller than a lower limit value in the threshold value range, using the value concerning the Y value of the unextracted pixel with the minimum difference between the value concerning the Y value of each of one or more unextracted pixels and the lower limit value in the threshold value range as a lower limit value, a new threshold value range is set.

4. An image processing system for setting a threshold value range for a value concerning a Y value representing brightness of a pixel selected from an image and extracting and displaying a pixel with the value concerning the Y value in the image within the threshold value range, said image processing system comprising:

first threshold value setting means, when a pixel is selected in the image, for setting the threshold value range in a range of adding a predetermined value to the value concerning the Y value of the selected pixel and/or subtracting the predetermined value therefrom; and second threshold value setting means, when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, said second threshold value setting means for setting a new threshold value range, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, second threshold value setting means for setting a new threshold value range.

5. The image processing system as claimed in claim 4, further comprising enlargement display means for displaying a part of an extracted image on an enlarged scale.

6. The image processing system according to claim 4, further comprising selecting means for selecting the pixel on a display screen displaying the image.

7. The image processing system according to claim 6, wherein the selecting means includes a pointer.

8. The image processing system according to claim 4, wherein the Y value is a Y value itself or a value provided by performing preprocessing for image improvement for the Y value.

9. An image processing system for setting a threshold value range for a value concerning a Y value representing brightness of a pixel selected from an image and extracting and displaying a pixel with the value concerning the Y value in the image within the threshold value range, said image processing system comprising:

first threshold value setting means, when an unextracted pixel is selected, for setting the threshold value range in a range of adding a predetermined value to the value concerning the Y value of the selected unextracted pixel and/or subtracting the predetermined value therefrom; and second threshold value setting means, when an already extracted pixel is selected, if the value concerning the Y value of each of one or more unextracted pixels of pixels in a predetermined range containing the already extracted pixel selected is greater than an upper limit value in the threshold value range, said second threshold value setting means using the value concerning the Y value of the unextracted pixel with the minimum difference between the value concerning the Y value of each of one or more unextracted pixels and the upper limit value in the threshold value range as an upper limit value for setting a new threshold value range, or if the value concerning the Y value of each of one or more unextracted pixels of pixels in a predetermined range containing the already extracted pixel selected is smaller than a lower limit value in the threshold value range, said second threshold value setting means using the value concerning the Y value of the unextracted pixel with the minimum difference between the value concerning the Y value of each of one or more unextracted pixels and the lower limit value in the threshold value range as a lower limit value for setting a new threshold value range.

10. The image processing system according to claim 6, further comprising selecting means for selecting the pixel on a display screen displaying the image.

11. The image processing system according to claim 10, wherein the selecting means includes a pointer.

12. The image processing system according to claim 9, wherein the Y value is a Y value itself or a value provided by performing preprocessing for image improvement for the Y value.

13. An image processing system for setting a threshold value range for a value concerning a Y value representing brightness of a pixel selected from an image and extracting and displaying a pixel with the value concerning the Y value in the image within the threshold value range, said image processing system comprising:

storage means for storing a history of a selected pixel;

first threshold value setting means, when a pixel is selected in the image based on the storage result of said storage means, for setting the threshold value range in a range of adding a predetermined value to the value concerning the Y value of the selected pixel and/or subtracting the predetermined value therefrom; and second threshold value setting means, when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, said second threshold value setting means for setting a new threshold value range, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, second threshold value setting means for setting a new threshold value range.

14. The image processing system as claimed in claim 13, further comprising enlargement display means for displaying a part of an extracted image on an enlarged scale.

15. The image processing system according to claim 13, further comprising selecting means for selecting the pixel on a display screen displaying the image.

16. The image processing system according to claim 15, wherein the selecting means includes a pointer.

17. The image processing system according to claim 13, wherein the Y value is a Y value itself or a value provided by performing preprocessing for image improvement for the Y value.

18. An image processing system comprising:

selection means for operating a displayed pointer superimposed on an image and selecting a target pixel from the image;

threshold value setting means for setting a threshold value range for a value concerning a Y value representing brightness of the pixel;

extraction means for extracting a pixel with the value concerning the Y value in the image within the threshold value range;

display means for displaying the extraction result;

storage means for storing a history of a selected pixel;

first threshold value setting means, when a pixel is selected in the image based on the storage result of said storage means, for setting the threshold value range in a range of adding a predetermined value to the value concerning the Y value of the selected pixel and/or subtracting the predetermined value therefrom; and second threshold value setting means, when after the pixel is selected, a pixel different from that pixel is selected, if the value concerning the Y value of the selected pixel is greater than the value concerning the Y value of the pixel for which the threshold value range is set, between the predetermined value added to the value concerning the Y value of the selected pixel and a lower limit value in the threshold value range, said second threshold value setting means for setting a new threshold value range, or if the value concerning the Y value of the selected pixel is smaller than the value concerning the Y value of the pixel for which the threshold value range is set, between the predetermined value subtracted from the value concerning the Y value of the selected pixel and an upper limit value in the threshold value range, second threshold value setting means for setting a new threshold value range.

19. The image processing system as claimed in claim 18, further comprising enlargement display means for displaying a part of an extracted image on an enlarged scale.

20. The image processing system according to claim 18, wherein the Y value is a Y value itself or a value provided by performing preprocessing for image improvement for the Y value.

21. An image processing system for setting a threshold value range for a value concerning a Y value representing brightness of a pixel selected from an image and extracting and displaying a pixel with the value concerning the Y value in the image within the threshold value range, said image processing system comprising:

storage means for storing a history of an extracted pixel;

first threshold value setting means, when an unextracted pixel is selected based on the storage result of said storage means, for setting the threshold value range in a range of adding a predetermined value to the value concerning the Y value of the selected pixel and/or subtracting the predetermined value therefrom; and second threshold value setting means, when an already extracted pixel is selected, if the value concerning the Y value of each of one or more unextracted pixels of pixels in a predetermined range containing the already extracted pixel selected is greater than an upper limit value in the threshold value range, said second threshold value setting means using the value concerning the Y value of the unextracted pixel with the minimum difference between the value concerning the Y value of each of one or more unextracted pixels and the upper limit value in the threshold value range as an upper limit value for setting a new threshold value range, or if the value concerning the Y value of each of one or more unextracted pixels of pixels in a predetermined range containing the already extracted pixel selected is smaller than a lower limit value in the threshold value range, said second threshold value setting means using the value concerning the Y value of the unextracted pixel with the minimum difference between the value concerning the Y value of each of one or more unextracted pixels and the lower limit value in the threshold value range as a lower limit value for setting a new threshold value range.

22. The image processing system according to claim 21, further comprising selecting means for selecting the pixel on a display screen displaying the image.

23. The image processing system according to claim 22, wherein the selecting means includes a pointer.

24. The image processing system according to claim 21, wherein the Y value is a Y value itself or a value provided by performing preprocessing for image improvement for the Y value.

25. An image processing system comprising:

selection means for operating a displayed pointer superimposed on an image and selecting a target pixel from the image;

threshold value setting means for setting a threshold value range for a value concerning a Y value representing brightness of the pixel;

extraction means for extracting a pixel with the value concerning the Y value in the image within the threshold value range;

display means for displaying the extraction result;

storage means for storing a history of an extracted pixel;

first threshold value setting means, when an unextracted pixel is selected based on the storage result of said storage means, for setting the threshold value range in a range of adding a predetermined value to the value concerning the Y value of the selected pixel and/or subtracting the predetermined value therefrom; and second threshold value setting means, when an already extracted pixel is selected, if the value concerning the Y value of each of one or more unextracted pixels of pixels in a predetermined range containing the already extracted pixel selected is greater than an upper limit value in the threshold value range, said second threshold value setting means using the value concerning the Y value of the unextracted pixel with the minimum difference between the value concerning the Y value of each of one or more unextracted pixels and the upper limit value in the threshold value range as an upper limit value for setting a new threshold value range, or if the value concerning the Y value of each of one or more unextracted pixels of pixels in a predetermined range containing the already extracted pixel selected is smaller than a lower limit value in the threshold value range, said second threshold value setting means using the value concerning the Y value of the unextracted pixel with the minimum difference between the value concerning the Y value of each of one or more unextracted pixels and the lower limit value in the threshold value range as a lower limit value for setting a new threshold value range.

26. The image processing system according to claim 25, wherein the Y value is a Y value itself or a value provided by performing preprocessing for image improvement for the Y value.

* * * * *